(12) United States Patent
Villwock

(10) Patent No.: US 6,947,511 B2
(45) Date of Patent: Sep. 20, 2005

(54) METHOD AND DEVICE FOR FINDING A REFERENCE PATTERN IN A SERIAL DIGITAL DATA STREAM

(75) Inventor: Christian Villwock, Grossbeeren (DE)

(73) Assignee: Tektronix International Sales GmbH, Schaffhausen (CH)

( * ) Notice: Subject to any disclaimer, the term of this patent is extended or adjusted under 35 U.S.C. 154(b) by 783 days.

(21) Appl. No.: 09/912,798

(22) Filed: Jul. 24, 2001

(65) Prior Publication Data
US 2002/0037064 A1 Mar. 28, 2002

(30) Foreign Application Priority Data
Sep. 22, 2000 (EP) .......................................... 00120747

(51) Int. Cl.$^7$ ................................................. H04L 7/00
(52) U.S. Cl. ......................... 375/368; 375/142; 375/150
(58) Field of Search ................................. 375/368, 142, 375/150

(56) References Cited

U.S. PATENT DOCUMENTS 4,524,345 A * 6/1985 Sybel et al. ................ 708/212

* cited by examiner

Primary Examiner—Mohammed Ghayour
Assistant Examiner—Juan A. Torres
(74) Attorney, Agent, or Firm—Francis I. Gray

(57) ABSTRACT

A method and device for finding a reference pattern in a serial stream of digital data draws up comparison tables for the front and rear bits of the reference pattern. Using the comparison table for the front bits, bits which in terms of time are located upstream of a point P in the data stream are compared, and using the comparison table for the rear bits, bits which in terms of time are located downstream of point P in the data stream are compared. Next, the number of bits matching the reference pattern upstream and downstream of the point P are added up, and in case the sum total is greater than or equal to the number of bits in the reference pattern, there is a signal that the reference pattern has been found.

24 Claims, 3 Drawing Sheets

```
..... xxxx xxxx | 0000 0000 | 1xxx xxxx | xxxx xxxx .....
..... xxxx xxxx | x000 0000 | 01xx xxxx | xxxx xxxx .....
..... xxxx xxxx | xx00 0000 | 001x xxxx | xxxx xxxx .....
..... xxxx xxxx | xxx0 0000 | 0001 xxxx | xxxx xxxx .....
..... xxxx xxxx | xxxx 0000 | 0000 1xxx | xxxx xxxx .....
..... xxxx xxxx | xxxx x000 | 0000 01xx | xxxx xxxx .....
..... xxxx xxxx | xxxx xx00 | 0000 001x | xxxx xxxx .....
..... xxxx xxxx | xxxx xxx0 | 0000 0001 | xxxx xxxx .....
```

Fig. 1

```
xxxx xxxx | 1100 0000 | 0001 0000 | xxxx xxxx
```

Fig. 7

Overview "Left"
0000 0000 -> 8
x000 0000 -> 7
xx00 0000 -> 6
xxx0 0000 -> 5
xxxx 0000 -> 4
xxxx x000 -> 3
xxxx xx00 -> 2
xxxx xxx0 -> 1
xxxx xxx1 -> 0

Overview "Right"
0000 0001 -> 8
0000 001x -> 7
0000 01xx -> 6
0000 1xxx -> 5
0001 xxxx -> 4
001x xxxx -> 3
01xx xxxx -> 2
1xxx xxxx -> 1
0xxx xxxx -> 0

Comparison Table T1

Comparison Table T2

METHOD AND DEVICE FOR FINDING A REFERENCE PATTERN IN A SERIAL DIGITAL DATA STREAM

BACKGROUND OF THE INVENTION

The present invention relates to protocol testing of a communications network, and more particularly to a method and device for finding a reference pattern in a serial digital data stream.

For pattern recognition in a continuous binary data stream based on software, particularly for finding a reference pattern in a serial stream of digital data, there is a problem that microprocessors can only process data aligned bytewise (or multiples thereof). The data are usually provided bytewise by a hardware component, such as a memory, with the hardware component compiling the serial data stream in segments aligned bytewise. However, since the reference pattern to search for may appear at any position in the data stream, and thus does not necessarily have to be aligned bytewise, it is necessary, under the state of the art, to work with computationally time-consuming operations across several segments. In particular there are the repetitive operations of comparison, bitwise shifting, and "AND" and "OR" link use. When looking for longer reference patterns, the search proves time-consuming.

What is desired is to further develop a generic method so that finding a reference pattern in a serial data stream becomes possible in a shorter time span.

BRIEF SUMMARY OF THE INVENTION

Accordingly the present invention provides a method and device for finding a reference pattern in a serial digital data stream by comparing a certain number of bits upstream of a point P between two bits in the data stream, and a certain number of bits downstream of said point P, so as to find a reference pattern in the serial data stream, using comparison tables drawn up beforehand to identify bit sequences emanating from point P and matching the bit sequence of the reference pattern, and to add up the number of matching bits upstream of point P and downstream of point P. If the sum total is at least as great as the number of bits in the reference pattern, the reference pattern has been found. The comparison tables, which may be prepared beforehand in a non-time critical way, allow the number of necessary AND and OR links to be significantly reduced and eliminate bitwise shifting. The comparison tables may be made up of several sub-tables. All combinations that are possible with the bit lengths assigned to the relevant entries are filed in the tables together with the number of bits matching the reference pattern. This way, only the match with one table entry has to be checked when comparing bit sequences from the serial data stream with the reference pattern. If there is a match with a table entry, it is then sufficient to read out the associated number of matching bits from the table. The combinations, which are possible with the bit lengths assigned to the relevant entries, are filed by software as analogue numerical values together with the number of matching bits in a bit sequence. During the comparison of bit sequences from the data stream, these are first converted into an analogue value, which may then be used to read out the number of matching bits in a bit sequence from the table. By this measure it is possible to read out the number of matching bits from the table very quickly. The combinations in the tables, and to the extent that the tables have sub-tables, the combinations in the sub-tables, are arranged in the sequence of decreasing numbers of bits matching the reference pattern. In the comparison of bit sequences from the data stream they are compared in said sequence with the entries in the tables, and the comparison is stopped at the first match. So it is sufficient to compare the bit sequence on average with half as many entries as in a sequence of table entries not arranged according to the sequence of matching bits. Only one entry in a table is specified for each possible number of bits matching the reference pattern. The bit sequences from the data stream are compared one by one with the entries in the table, with only the number of bits, which according to the entry in the table are identical with the reference pattern, being included in the comparison. This results in a further reduction of the calculation work. The entries in the comparison tables are whole-number multiples of x. Preferably, the two comparison tables are of the same length. A large area of data of the data stream may quickly be examined, if the entries in the comparison tables are exactly as long as the reference pattern.

The objects, advantages and other novel features of the present invention are apparent from the following description when read in conjunction with the appended claims and attached drawing.

BRIEF DESCRIPTION OF THE SEVERAL VIEWS OF THE DRAWING

FIG. 1 shows examples of the appearance of the reference pattern 0000 0000 1 in a digital data stream.

FIG. 3 is an overview showing the number of front bits matching a reference pattern 0000 0000 1 for different bit patterns of front bits.

FIG. 4 is an overview showing the number of rear bits matching the reference pattern 0000 0000 1 for different bit patterns of rear bits.

FIG. 5 is a comparison table showing the number of front bits of 8-bit sequences, which match the reference pattern 0000 0000 1, in the sequence of their analogue values.

FIG. 6 is a comparison table showing the number of rear bits of 8-bit sequences, which match the reference pattern 0000 0000 1, in the sequence of their analogue values.

FIG. 7 is an example of how to find the reference pattern 0000 0000 1 in a digital data stream.

DETAILED DESCRIPTION OF THE INVENTION

Figure 2:
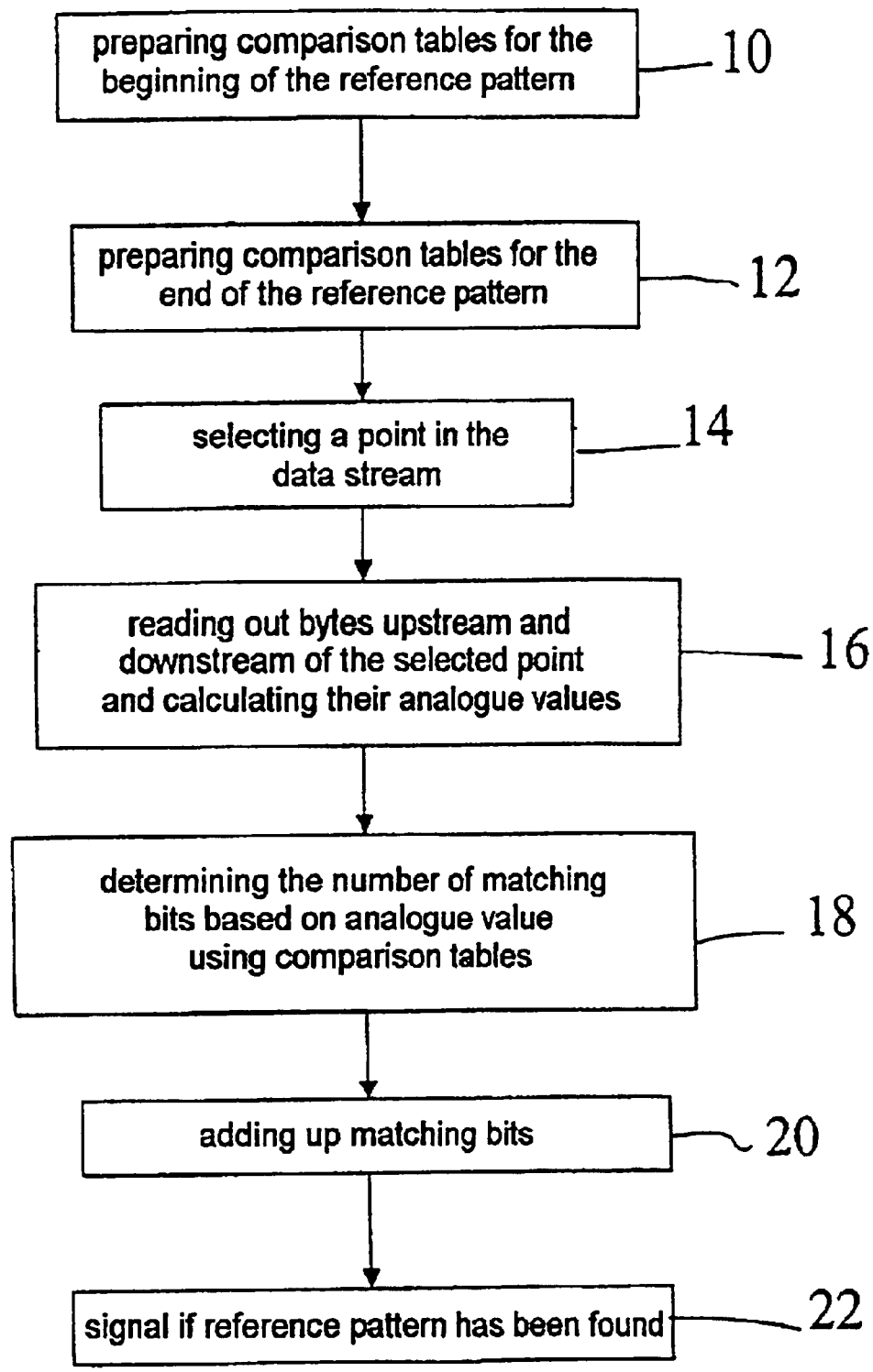
FIG. 2 shows a sequence diagram for a method according to the present invention for finding a reference pattern in a digital data stream.

First, the possible appearance of a reference pattern in an arbitrary, continuous data stream aligned bytewise is illustrated using FIG. 1. In FIG. 1, "x" represents any bit, i.e., 1 or 0. The reference pattern 0000 0000 1, which can always be accommodated within two bytes, has been selected as an example. FIG. 1 now shows different positions of the reference pattern within two bytes, each one shifted by one bit with respect one another, as can be found in reality, and in which the reference pattern is to be found.

In the following, it is assumed that a bit sequence runs from left to right, i.e., the beginning of the bit sequence is on the left and the end of the bit sequence is on the right. Accordingly, the bits arranged on the left-hand side are referred to as the front bits of a bit sequence and the bits arranged on the right-hand side are referred to as the rear bits of the bit sequence. In accordance with this assumption, the reference pattern 0000 0000 1 selected in FIG. 1 has the bit 0 at the beginning and the bit 1 at the end.

Referring now to the sequence diagram shown in FIG. 2, the reference pattern 0000 0000 1 is chosen as an example. In the first step 10, a comparison table, T1, is first drawn up for the beginning of the reference pattern. The entries in the comparison table T1 are meant to each correspond to bit sequences with a length of 8 bits, i.e., one byte. This suggests itself because the data stream is usually read out bytewise.

Figures 3, 4, 5, 6:
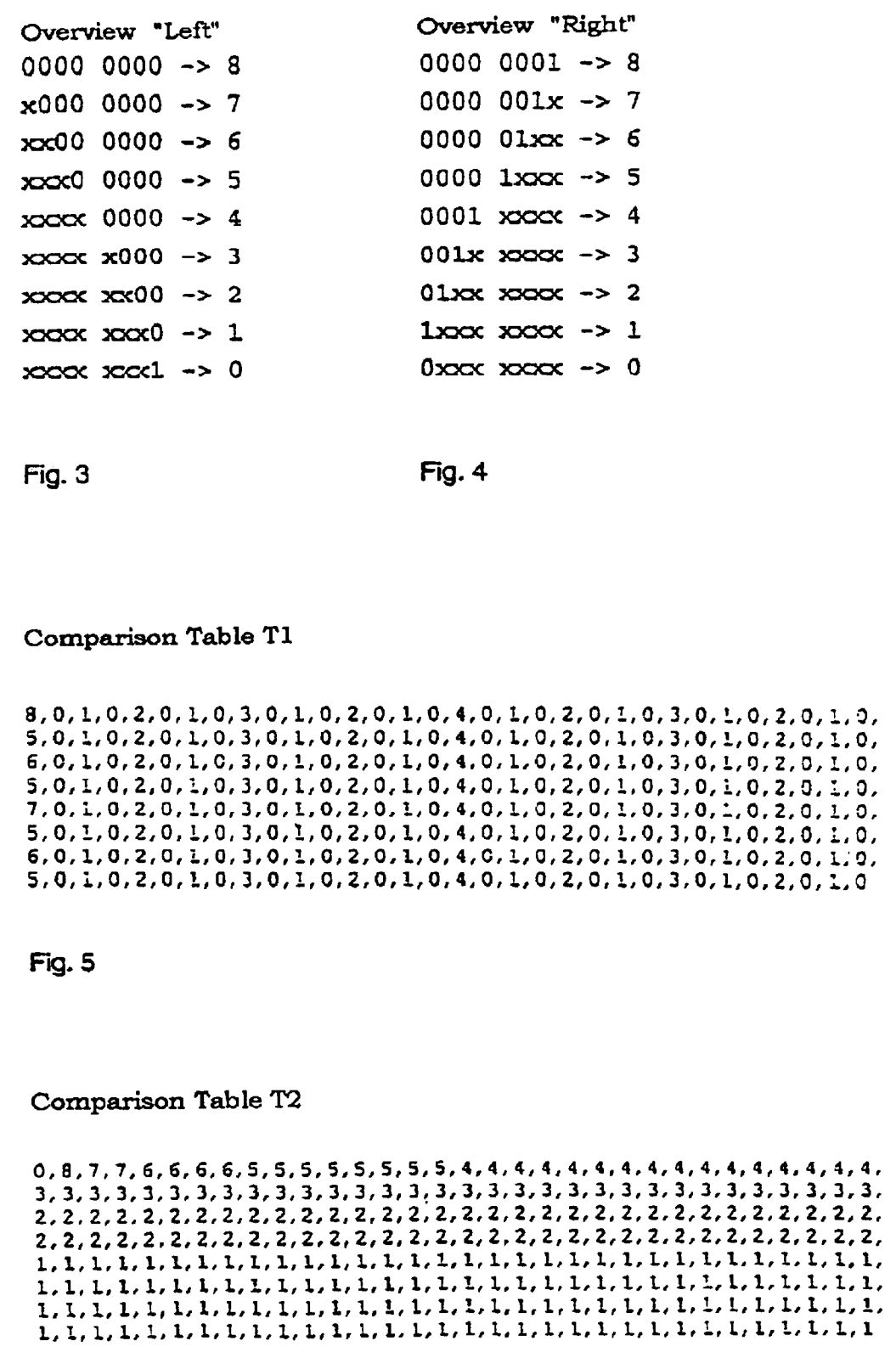

To generate the comparison table T1, one determines for all $2^8=256$ possible bit sequences with 8 bits, in how many bits there are matches with front bits of the reference pattern. Only those bits are considered to be matching which, starting from the end of the bit sequence examined, match partial bit sequences of the reference pattern, the partial bit sequences of the reference pattern starting with the beginning of the reference pattern. This is made clear by the overview "Left" in FIG. 3, in which the number of bits matching the beginning of the reference pattern 0000 0000 1 is shown for all possible bit sequences. The bits whose values are of no significance are named "x". With the aid of this overview, comparison table T1, FIG. 5, is drawn up. In comparison table T1 it is sufficient to only file the number of matching bits if the associated analogue value becomes obvious from the sequence in which they are filed. This is made clear by the following values selected as examples. The first value in comparison table T1, FIG. 5, belongs to the analogue value 0, for which the corresponding bit sequence is 0000 0000. According to the first line in the overview "Left", FIG. 3, the sequence has eight bits matching the beginning of the reference pattern 0000 0000 1. Accordingly, the value 8 has been entered in comparison table T1. The second value in comparison table T1, FIG. 5, belongs to the analogue value 1, for which the corresponding bit sequence is 0000 0001. According to the last line in the overview "Left", FIG. 3, there is no bit matching the beginning of the reference pattern 0000 0000 1 for this bit sequence. Accordingly, the value 0 has been entered in comparison table T1. Furthermore, in the last but one position, for example, comparison table T1 shows the value 1 because the bit sequence belonging to the analogue value 254 is 1111 1110, which according to the last but one line in the overview "Left" features exactly one bit matching the beginning of the reference pattern. Finally, in the last position comparison table T1 shows the value 0, because the bit sequence 1111 1111, which corresponds to the analogue value 255, features no bit matching the beginning of the reference pattern, as can be seen from the last line of the overview "Left", FIG. 3.

In the next step 12, a corresponding comparison table T2, FIG. 6, is drawn up for matches with the end of the reference pattern. The comparison table T2, too, shows entries that correspond to bit sequences which are 1 byte, i.e. eight bits long. The procedure in drawing up comparison table T2 is analogous to that of comparison table T1, with only those bits considered to be matching which are contained in a partial bit sequence matching the end of the reference pattern, the partial bit sequence having to be at the beginning of the entries in comparison table T2. This becomes clear from the overview "Right" in FIG. 4, in which the number of bits matching the end of the reference pattern 0000 0000 1 is shown for all bit sequences possible with 8 bits. With the aid of the overview "Right" in FIG. 4, comparison table T2 shown in FIG. 6 is generated. It contains the numbers of the bits which match the end of the reference pattern in the sequence of the analogue values. In the first position, for example, there is a 0 because, according to the last line in the overview "Right", FIG. 4, there is no bit matching the end of the reference pattern 0000 0000 1 for the analogue value 0, i.e., the bit sequence 0000 0000.

With the comparison tables T1 and T2 drawn up once in steps 10 and 12, a point P is selected between two bytes in the data stream, step 14. In the next step 16, the byte lying upstream of point P and the byte lying downstream of point P are read out, and the relevant analogue values calculated. Using the analogue values, the number of bits matching the beginning of the reference pattern is quickly determined from comparison table T1, FIG. 5, for the byte upstream of point P, and the number of bits matching the end of the reference pattern is quickly determined from comparison table T2, FIG. 6, for the byte downstream of point P, step 18.

In step 20, the sum total of the number of matching bits upstream and downstream of point P is determined. If the sum total of matching bits is at least as high as the number of bits in the reference pattern, a signal is generated to indicate that the reference pattern has been found in the two bytes examined, step 22. From the number of bits matching the reference pattern upstream and downstream of point P, the position of the reference pattern within the two bytes is known.

If, for example, the byte upstream of point P consists of the bit sequence 1100 0000 and the byte downstream of point P consists of the bit sequence 0001 0000, FIG. 7, the analogue values are calculated to be 192 and 16. For the analogue value 192, i.e., at the 193rd position (compare with the third line in the overview "Left"), the value of 6 bits matching the beginning of the reference pattern 0000 0000 1 is read out from comparison table T1, FIG. 5, and for the analogue value 16, i.e., at the 17th position (compare with the fifth line in the overview "Right"), the value of 4 bits matching the end of the reference pattern 0000 0000 1 is read out from comparison table T2, FIG. 6. The total sum of matching bits is 10, which is greater than the number of bits in the reference pattern 0000 0000 1. Thus, a signal is generated indicating that the reference pattern has been found.

If the reference pattern was not found, there is a move to the next byte, and the next two bytes are loaded from the data stream and subjected to the aforementioned comparison with the comparison tables.

In principle, the analogue values may be stored in the comparison tables together with the number of matching bits of even longer bit sequences. However, this has the disadvantage of making the comparison tables bigger, which therefore requires more storage space. Above all, however, the time needed for making comparisons with large comparison tables increases. For finding longer reference patterns, comparison tables with several sub-tables are therefore drawn up.

Although the entries in the individual sub-tables may theoretically have any length, it is assumed in the following description that the entries in the individual sub-tables each have a length of 8 bits because, as mentioned, the data stream is usually read out bytewise. In the following example it is assumed that a first comparison table, T1', comprises two sub-tables, ST11 and ST121, a second comparison table, T2', also comprises two sub-tables, namely sub-tables ST21 and ST221. With reference to point P, the arrangement of these tables with respect to the bit sequences running through them is as follows:

ST11-ST121-P-ST221-ST21

For drawing up the first sub-table, ST11, of comparison table T1', one proceeds in the same way as for drawing up comparison table T1 without the sub-tables, by filing in the first sub-table ST11 the number of bits matching the first eight bits of the reference pattern for all possible bit sequences in the sequence of the associated analogue values; compare with step 10 above. Again, only those bits are considered to be matching which are contained in partial bit sequences that are located at the beginning of the reference pattern. The corresponding partial bit sequences must be at the end in sub-table ST11.

In the second sub-table, ST121, those analogue values of the bit sequences are filed which for 8-bit matches should adjoin the bit sequences filed in sub-table ST11.

Analogous to step 12, for drawing up the first sub-table, ST21, of comparison table T2', based on a length of the entries of one byte, the number of bits matching the rear bits of the reference pattern is filed in the sequence of the analogue values of the associated bit sequences for all possible 256 bit sequences, with bits considered to be matching that are contained in partial bit sequences which are located at the end of the reference pattern and at the beginning of the 256 bit sequences. Analogous to the drawing up of sub-table ST121, when sub-table ST221 is drawn up, those analogue values of the bit sequences are filed which for 8-bit matches should adjoin the bit sequences filed in sub-table ST21.

With the comparison tables drawn up once, a point P is selected between two bytes in the reference pattern, analogous to step 14, to find the reference pattern, and analogous to step 16, the two bytes lying upstream of point P in terms of time and the two bytes lying downstream of point P in terms of time are read out, and their respective analogue values are calculated. With the aid of the analogue values, the matching bits are determined from sub-tables ST11, ST121, ST21 and ST221. In the present case where sub-tables are used, one has to check first of all whether the sum total of the matches is higher than the number of bits of the reference pattern. Furthermore, one also needs to check whether the entries, which have led to "hits", are at corresponding positions in the sub-tables, i.e., whether a compilation of the hits of the individual sub-tables actually leads to the reference pattern sought. Only when this prerequisite has also been satisfied is there a signal that the reference pattern has been found; compare with step 22.

Irrespective of the embodiment just described, it is possible to sub-divide comparison tables into a large number of sub-tables. In this way, with reference to the aforementioned example, further sub-tables, ST122 to ST12j, j≧2, may be inserted into comparison table T1' between sub-tables ST11 and ST121. The same is true for comparison table T2' into which further sub-tables, ST222 to ST22i, i≧2, may be inserted between sub-tables ST21 an ST221. As is obvious to one skilled in the art, comparison tables with sub-tables and comparison tables without sub-tables may be combined in the search for a reference pattern.

The above approach is now described in more detail using as an example the reference pattern:

0000 0000 0000 0000 0000 0000 1.

Here, it makes sense to examine two bytes upstream of the selected point P and two bytes downstream of the selected point P, because the reference pattern is always located within four bytes. Comparison table T1' then has the two sub-tables ST11 and ST121. Comparison table T2' also has two sub-tables, ST21 and ST221, if it is again assumed that the entries in the sub-tables are one byte long.

To draw up the first sub-table, ST11, of comparison table T1', step 10, the analogue value is calculated for all 256 bit sequences and filed together with the number of bits at the end of the bit sequence which match the beginning of the reference pattern together with the number of zeroes located at the end of the bit sequence. To this end, the overview "Left", FIG. 3, may be used because the first 8 bits of the reference pattern 0000 0000 1 selected earlier and of the reference pattern selected now are identical. As a result, the first sub-table, ST11, of comparison table T1' looks the same as comparison table T1, FIG. 5.

In the present example, drawing up the second sub-table, ST121, becomes simpler: regardless of how the beginning of the reference pattern in the first sub-table, ST11, is actually placed, there only is a single bit sequence in the second sub-table, ST121, that leads to 8 "hits": 8 zeroes. For every other bit sequence, sub-table ST121 shows 0 hits. Accordingly, in sub-table 121, for position 0, which corresponds to a bit sequence of 8 zeroes, the analogue value 8 is filed, which corresponds to 8 hits. For all other bit sequences which may be included in sub-table ST121 according to their sequence, the entries are 0, which corresponds to 0 hits.

To draw up the first sub-table, ST21, of comparison table T2', which serves for comparison with the end of the reference pattern, the analogue value is also calculated for all possible bit sequences, and filed together with the length of the partial bit sequences at the beginning of the bit sequences which match the beginning of the reference pattern. The procedure is the same as that for drawing up comparison table T2 for the previous reference pattern 0000 0000 1. Sub-table ST21 of comparison table T2' for the above reference pattern is therefore identical with comparison table T2, FIG. 6, for the reference pattern 0000 0000 1.

In the present example, drawing up the second sub-table, ST221, again becomes simpler (compare with description given for drawing up sub-table ST121): regardless of how the end of the reference pattern in sub-table ST21 is actually placed, there only is a single bit sequence in sub-table ST221 that leads to 8 "hits": 8 zeroes. For every other bit sequence, sub-table ST221 shows 0 hits. Accordingly, in sub-table 221, for position 0 which corresponds to a bit sequence of 8 zeroes, the analogue value 8 is filed, which corresponds to 8 hits. For all other bit sequences that may be included in sub-table ST221 in accordance with their sequence, the entries are 0, which corresponds to 0 hits.

To evaluate a 4 byte-wide section in the data stream, a point P is selected between two bytes in the data stream, step 14, and in step 16 two bytes located upstream of point P in terms of time and two bytes located downstream of point P in terms of time are read out and their analogue values are calculated. In the next step 18, with the aid of the analogue values from comparison tables T1' and T2', the number of bits matching the reference pattern is determined, the first sub-table, ST11, of comparison table T1' being used for the byte lying at the beginning of the data stream in terms of time, and for the byte succeeding said byte, the second sub-table, ST121, of comparison table T2' is used. For the byte lying directly downstream of point P in terms of time, the second sub-table, ST221, of comparison table T2' is applicable, and, finally, for the second byte lying downstream of point P, the first sub-table ST21 of the comparison table T2' is applicable. If the sum total of matching bits is greater than or equal to twenty-five, step 20, and if the number of matching bits of the byte upstream of point P and of the byte downstream of point P equals eight, there is a signal in step 22 that the reference pattern has been found in the data stream. From the number of matching bits of the bytes lying at the beginning and at the end of the data stream in terms of time, the exact position of the reference pattern in the data stream is derived unequivocally.

Thus the present invention provides a method and device for finding a reference pattern in a serial digital data stream by drawing up comparison tables for the front and back bits of a specified number of bytes around a point P, comparing the analogue values of the bytes of the serial digital data stream about P with the corresponding "hits" in the comparison tables, summing the hits from the comparison tables, and indicating that the reference pattern is found if the number of hits at least equals the number of bits in the reference pattern.

What is claimed is:

1. A method of finding a reference pattern in a serial digital data stream, the reference pattern being n bits long, comprising the steps of:
   a) drawing up a first table for comparing bits of the serial digital data stream with a front k bits of the reference pattern, $1 \leq k \leq n$ and entries in the first table having a first bit length;
   b) drawing up a second table for comparing bits of the serial digital data stream with a rear m bits of the reference pattern, $1 \leq m \leq n$ entries in the second table having a second bit length;
   c) defining of a point between two bits in the serial digital data stream;
   d) comparing a number of bits equal to the first bit length located upstream of the point in terms of time with the entries in the first table and determining a maximum number of bits in a matching bit sequence proceeding from the point;
   e) comparing a number of bits equal to the second bit length located downstream of the point in terms of time with the entries in the second table and determining a maximum number of bits in a matching bit sequence proceeding from the point;
   f) determining a sum total of the maximum numbers determined in steps d) and e); and
   g) generating a signal indicating that the reference pattern has been found when the sum total determined in step f) is equal to or greater than n.

2. The method according to claim 1 wherein at least one of the tables is subdivided into a first sub-table and one or more second sub-tables, with one of the second sub-tables lying closest to the point in a comparison and any other second sub-tables and the first sub-table adjoining the one second sub-table in the direction away from the point, with the maximum numbers of matches of the entries of the sub-tables being determined in the relevant comparison steps d) and e), and the signal of step g) only being generated when
   i) the maximum number of matches of the second sub-tables equals the length of the corresponding entries, and
   ii) the sum total of the corresponding bits is equal to or greater than n.

3. The method according to claim 2 wherein the signal of step g) is only generated so long as it continues to be possible to determine that, when put together, the entries of each of the sub-tables which make up the match contain the reference pattern.

4. The method according to claims 1, 2 or 3 wherein in the tables, all combinations that are possible with the bit lengths allocated to the relevant entries are filed together with the number of bits which match the reference pattern in the relevant combination, or only the number of bits which match the reference pattern in the relevant combination is filed solely in a predetermined arrangement.

5. The method according to claim 4 wherein the combinations are each filed as an analogue numerical value and in the comparison of steps d) and e) the serial digital data stream bit sequence to be compared is converted into an analogue value.

6. The method according to claim 4 wherein in the tables, and where referenced back to claim 2 also in the sub-tables, the entries are arranged in the sequence of decreasing numbers of bits matching the reference pattern, with the comparison of steps d) and e) taking place in said sequence and the comparison being stopped at the first match, or in the sequence of increasing number of bits matching the reference pattern, with the comparison of steps d) and e) taking place in said sequence and the comparison being stopped as soon as no match is determined any longer for the first time.

7. The method according to claim 6 wherein for each possible number of bits matching the reference pattern there is only one single entry in the relevant tables, with only the positions of these bits being included in the comparison of steps d) and e).

8. The method according to claim 4 wherein a fixed number of bits from the serial digital data stream are submitted to the comparison of steps d) and e), with the number of bits from each table being equal to each other and to an integer multiple of the fixed number of bits.

9. The method according to claim 8 wherein the fixed number of bits is ten or an integer multiple of eight.

10. The method according claim 8 wherein n is an integer multiple of the fixed number of bits plus 1.

11. The method according to claim 10 wherein the reference pattern is selected from the group consisting of a string of zeroes with a one at the beginning or end and a string of ones with a zero at the beginning or end.

12. The method according to claim 4 wherein the tables, and where referenced back to claim 2 also the sub-tables, are drawn up beforehand in a non-time-critical way.

13. A device for finding a reference pattern in a serial digital data stream, the reference pattern being n bits long, comprising:
   means for drawing up a first table for comparing bits of the serial digital data stream with a front k bits of the reference pattern, $1 \leq k \leq n$ and entries in the first table having a first bit length;
   means for drawing up a second table for comparing bits of the serial digital data stream with a rear m bits of the reference pattern, $1 \leq m \leq n$ and entries in the second table having a second bit length;
   means for defining of a point between two bits in the serial digital data stream;
   means for comparing a number of bits equal to the first bit length located upstream of the point in terms of time with the entries in the first table and determining a maximum number of bits in a matching bit sequence proceeding from the point;
   means for comparing a number of bits equal to the second bit length located downstream of the point in terms of time with the entries in the second table and determining a maximum number of bits in a matching bit sequence proceeding from the point;
   means for determining a sum total of the maximum numbers determined the comparing means; and
   means for generating a signal indicating that the reference pattern has been found when the sum total is equal to or greater than n.

14. The device according to claim 13 wherein at least one of the tables is subdivided into a first sub-table and one or more second sub-tables, with one of the second sub-tables lying closest to the point in a comparison and any other second sub-tables and the first sub-table adjoining the one second sub-table in the direction away from the point, with the maximum numbers of matches of the entries of the sub-tables being determined in the relevant comparing means, and the signal of the generating means only being generated when i) the maximum number of matches of the second sub-tables equals the length of the corresponding entries, and ii) the sum total of the corresponding bits is equal to or greater than n.

15. The device according to claim 14 wherein the signal of the generating means is only generated so long as it continues to be possible to determine that, when put together, the entries of each of the sub-tables which make up the match contain the reference pattern.

16. The device according to claims 13, 14 or 15 wherein in the tables and, all combinations which are possible with the bit lengths allocated to the relevant entries are filed together with the number of bits which match the reference pattern in the relevant combination, or only the number of bits which match the reference pattern in the relevant combination is filed solely in a predetermined arrangement.

17. The device according to claim 16 wherein the combinations are each filed as an analogue numerical value and in the comparing means the serial digital data stream bit sequence to be compared is converted into an analogue value.

18. The device according to claim 16 wherein in the tables, and where referenced back to claim 2 also in the sub-tables, the entries are arranged in the sequence of decreasing numbers of bits matching the reference pattern, with the comparison of the comparing means taking place in said sequence and the comparison being stopped at the first match, or in the sequence of increasing number of bits matching the reference pattern, with the comparison of the comparing means taking place in said sequence and the comparison being stopped as soon as no match is determined any longer for the first time.

19. The device according to claim 18 wherein for each possible number of bits matching the reference pattern there is only one single entry in the relevant tables, with only the positions of these bits being included in the comparison of the comparing means.

20. The device according to claim 16 wherein a fixed number of bits from the serial digital data stream are submitted to the comparing means, with the number of bits from each table being equal to each other and to an integer multiple of the fixed number of bits.

21. The device according to claim 20 wherein the fixed number of bits is ten or an integer multiple of eight.

22. The device according claim 20 wherein n is an integer multiple of the fixed number of bits plus 1.

23. The device according to claim 22 wherein the reference pattern is selected from the group consisting of a string of zeroes with a one at the beginning or end and a string of ones with a zero at the beginning or end.

24. The device according to claim 16 wherein the tables, and where referenced back to claim 14 the sub-tables, are drawn up beforehand by the drawing means in a non-time-critical way.

* * * * *